US012489841B2

(12) United States Patent
Albero et al.

(10) Patent No.: US 12,489,841 B2
(45) Date of Patent: Dec. 2, 2025

(54) INDICATOR TRIGGERED ACTIVATION OF AUDIO/VIDEO RECORDING DEVICES WITHIN A MOBILE COMMUNICATION DEVICE

(71) Applicant: BANK OF AMERICA CORPORATION, Charlotte, NC (US)

(72) Inventors: George Anthony Albero, Charlotte, NC (US); Dustin Paul Stocks, Stallings, NC (US); Edward Lee Traywick, Bellbrook, OH (US); Jake Michael Yara, Mint Hill, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 387 days.

(21) Appl. No.: 17/725,258

(22) Filed: Apr. 20, 2022

(65) Prior Publication Data
US 2023/0344930 A1 Oct. 26, 2023

(51) Int. Cl.
*H04M 1/72421* (2021.01)
*G06V 40/16* (2022.01)
*G06V 40/20* (2022.01)
*G08B 25/01* (2006.01)

(52) U.S. Cl.
CPC ...... *H04M 1/72421* (2021.01); *G06V 40/176* (2022.01); *G06V 40/20* (2022.01); *G08B 25/016* (2013.01)

(58) Field of Classification Search
CPC . H04M 1/72421; G06V 40/174; G06V 40/20; G06V 20/52; G06V 40/28; G08B 25/016; G08B 21/0476
See application file for complete search history.

(56) References Cited

U.S. PATENT DOCUMENTS

| | | |
|---|---|---|
| 7,797,186 B2 | 9/2010 | Dybus |
| 8,995,785 B2 | 3/2015 | Knight et al. |
| 9,118,773 B2 | 8/2015 | Woloshyn |
| 9,858,595 B2 | 1/2018 | Barnes, Jr. |
| 9,996,315 B2 | 6/2018 | Barnes, Jr. |
| 10,013,878 B2 | 7/2018 | Ricci et al. |
| 10,020,899 B2 | 7/2018 | Diperna et al. |
| 10,107,583 B2 | 10/2018 | Stewart et al. |
| 10,491,314 B2 | 11/2019 | Diperna et al. |
| 10,534,819 B2 | 1/2020 | Ricci |
| 10,540,877 B1 | 1/2020 | Gersten |
| 10,623,963 B2 | 4/2020 | Borghei |
| 10,811,054 B2 | 10/2020 | Anderson et al. |
| 10,943,463 B1 * | 3/2021 | Clark .............. G08B 21/0438 |
| 11,039,259 B2 | 6/2021 | Goldstein et al. |

(Continued)

*Primary Examiner* — Margaret G Webb
(74) *Attorney, Agent, or Firm* — Moore & Van Allen PLLC; Lauren M. Stokes

(57) ABSTRACT

Automatically and covertly activating audio/video mechanisms within a mobile communication device when a user is confronted with a duress-inducing event or a situation based on receipt of a duress indicator. The duress indicator is a subtle user input, such as a personal gesture, personal audible code or device input that triggers the covert activation of audio/video recording mechanisms on a mobile communication device. As a result, audio and/or video data of a duress-inducing event can be captured absent other parties to the duress-inducing event being aware that audio/video data is being captured.

9 Claims, 3 Drawing Sheets

(56) References Cited

U.S. PATENT DOCUMENTS

| | | |
|---|---|---|
| 11,113,333 B2 | 9/2021 | Maharajh et al. |
| 11,381,414 B2 | 7/2022 | Ansari et al. |
| 2006/0082920 A1 | 4/2006 | Horiuchi |
| 2008/0102785 A1* | 5/2008 | Childress ............... G01S 5/0027 340/539.18 |
| 2012/0149350 A1* | 6/2012 | Fan ................... H04M 1/72421 455/418 |
| 2017/0318146 A1* | 11/2017 | Peter ................ H04M 1/72436 |
| 2018/0031169 A1 | 2/2018 | Urashima et al. |
| 2019/0026704 A1 | 1/2019 | Lee et al. |
| 2020/0238952 A1* | 7/2020 | Lindsay ................ G06V 30/194 |
| 2023/0064892 A1* | 3/2023 | Carter ................... H04N 23/65 |

\* cited by examiner

INDICATOR TRIGGERED ACTIVATION OF AUDIO/VIDEO RECORDING DEVICES WITHIN A MOBILE COMMUNICATION DEVICE

FIELD OF THE INVENTION

The present invention is related mobile communication device safety and, more specifically being able to covertly activate audio/video recording devices on a mobile communication device when the user is experiencing a duress-inducing event.

BACKGROUND

Typically, when an individual is confronted with a duress-inducing event, such as being accosted by an assailant or the like, the individual may have a desire to capture video or audio of the event as a means of assisting in subsequent apprehension of the assailant. However, accessing such features within a mobile communication device, such as a smart phone, typically requires a series of time-consuming user inputs. Moreover, if the assailant becomes aware that the individual is capturing video or audio of the event, the assailant is apt escalate matters further to the detriment of the individual.

Therefore, a need exists to develop systems, methods and the like for being able to covertly active audio and/or video mechanisms on a mobile communication device, such as to capture audio and/or video recordings when a user is confronted with a duress-inducing situation/event.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by automatically and covertly activating audio/video mechanisms within a mobile communication device when a user is confronted with a duress-inducing event or a situation (i.e., an event/situation in which the user may subsequently benefit from viewing or listening to a recording of the event, such as assistance in identifying parties involved in the duress-inducing event/situation).

According to embodiments of the invention, a first indicator is received at the mobile communication device that indicates that the user is experiencing a duress-inducing event. In response to receiving the first indicator, the mobile communication device is configured to activate one or more audio/video capturing devices to initiate covert recording of at least one of audio file, video file or an audio and video file. Covert recording occurs absent a visual indication or an audible indication on the mobile communication device that recording is occurring.

In specific embodiments of the invention, receiving the first indicator may include capturing image data with an image-capturing mechanism (e.g., camera or the like) of the mobile communication device and determining that the image data includes a predetermined facial or body gesture of the user. In other embodiments of the invention, receiving the first indicator may include capturing audio data with an audio-capturing mechanism (e.g., microphone or the like) of the mobile communication device and determining that the audio data includes a predetermined audio code (e.g., word, phrase, utterance or the like). In still further embodiments of the invention, receiving the first indicator includes receiving a predetermined input to the mobile communication device, such as (i) detecting a predetermined movement of the mobile communication device, and (ii) detecting a predetermined input to a touch screen display on the mobile communication device, or the like.

In specific embodiments of the invention, once the audio/video file is captured it is communicated (or streamed while being captured) to a third-party entity, such as a public safety/law enforcement agency or the like, responsible for analyzing the audio/video file to determine if further actions need to be taken. In related specific embodiments of the invention, the mobile communication device is equipped with object identification model(s) that are configured to analyze the objects in the video file to determine the presence of predetermined objects (e.g., weapons or the like) as a pre-requisite for communicating the audio/video file to the third-party entity. In other specific embodiments of the invention, the first indicator itself triggers communication of a request for physical appearance of a third-party entity, such as a public safety/law enforcement agency or the like. In other related embodiments of the invention, the communication of the audio/video file to the third-party entity or the request for physical appearance of a third-party entity may be triggered by receipt of a second indicator (i.e., a second gesture, audible code or device input different than the first indicator).

As such, by providing for a subtle user input, such as a personal gesture, personal audible code or device input to trigger covert activation of audio/video recording mechanisms on a mobile communication device, the present invention is able to capture audio and/or video data of a duress-inducing event absent other parties to the duress-inducing event being aware that audio/video data is being captured.

A mobile communication device defines first embodiments of the invention. The device includes a computing platform having a memory, one or more computing processor devices in communication with the memory, and one or more audio or video capturing devices in communication with at least one of the one or more computing processor devices. The device additionally includes an audio/video device control application that is stored in the memory and executable by at least one of the one or more computing processor devices. The audio/video and configured to receive, at the mobile communication device, a first indicator from a user that indicates that the user is experiencing a duress-inducing event. In response to receiving the first indicator, the audio/video control application is configured to activate at least one of the one or more audio or video capturing devices to initiate covert recording of at least one of audio file, video file or an audio and video file of an area surrounding the mobile communication device. The covert recording occurs absent a visual indication or an audible indication on the mobile communication device that recording is occurring.

In specific embodiments of the mobile communication device, the audio/video device control application is configured to receive the first indicator by capturing video data and determining that the video data includes a predetermined facial or body gesture of the user that defines the first indicator. In other related embodiments of the mobile communication device, the audio/video device control application is configured to receive the first indicator by capturing audio data and determining that the audio data includes a predetermined audible code provided by the user that defines the first indicator.

In further specific embodiments of the mobile communication device, the audio/video device control application is configured to receive the first indicator by receiving a predetermined input to the mobile communication device itself that defines the first indicator. In such embodiments of the mobile communication device, the predetermined input further comprises one of (i) detecting a predetermined movement of the mobile communication device, (ii) detecting a predetermined input to a touch screen display on the mobile communication device, and (iii) capturing a facial image of the user with a rear-facing image capturing device included within the mobile communication device.

In other specific embodiments of the mobile communication device, the audio/video device control application is further configured to communicate at least one of (i) the recorded at least one of the audio file, the video file or the audio and video file to a third-party entity responsible for analyzing the least one of the audio file, the video file or the audio and video file, and (ii) a request for physical appearance at the area of a public safety entity. In related embodiments the mobile communication device further includes one or more object identification models that are stored in the memory and executable by at least one of the one or more computing processors, The models are configured to analyze the video file or the audio and video file to identify predetermined objects in the video file or the audio and video file. In such embodiments, the audio/video device control application is further configured to communicate the at least one of (i) and (ii) in response to identification of one or more of the predetermined objects in the video file or the audio and video file. In other related embodiments of the mobile communication device, the audio/video device control application is further configured to communicate the at least one of (i) and (ii) in response to receiving a second indicator that indicates that the user requires assistance for the duress-inducing event. In such embodiments, the second indicator is received by one selected from the group consisting of (i) capturing video data and determining that the video data includes a predetermined facial or body gesture of the user that defines the second indicator, (ii) capturing audio data and determining that the audio data includes a predetermined audible code provided by the user that defines the second indicator, and (iii) receiving a predetermined input to the mobile communication device that defines the second indicator.

A computer-implemented method executed by one or more computing processor devices defines second embodiments of the invention. The method includes receiving, at a mobile communication device, a first indicator from a user that indicates that the user is experiencing a duress-inducing event. In addition, the method includes, in response to receiving the first indicator, activating at least one audio or video capturing devices on the mobile communication device to initiate covert recording of at least one of audio file, video file or an audio and video file of an area surrounding the mobile communication device. Covert recording occurs absent a visual indication or an audible indication on the mobile communication device that recording is occurring.

In specific embodiments of the method, receiving the first indicator further comprises one of (i) capturing video data and determining that the video data includes a predetermined facial or body gesture of the user that defines the first indicator, or (ii) capturing audio data and determining that the audio data includes a predetermined audible code provided by the user that defines the first indicator. In other specific embodiments of the method, receiving the first indicator further comprises receiving a predetermined input to the mobile communication device, such as, one of (i) detecting a predetermined movement of the mobile communication device, (ii) detecting a predetermined input to a touch screen display on the mobile communication device, and (iii) capturing a facial image of the user with a rear-facing image capturing device included within the mobile communication device.

In other specific embodiments the method further includes communicating at least one of (i) the recorded at least one of the audio file, the video file or the audio and video file to a third-party entity responsible for analyzing the least one of the audio file, the video file or the audio and video file, and (ii) a request for physical appearance at the area of a public safety entity. In related embodiments the method further includes analyzing the video file or the audio and video file to identify predetermined objects in the video file or the audio and video file. In such embodiments of the method, communicating the at least one of (i) and (ii) occurs in response to identification of one or more of the predetermined objects in the video file or the audio and video file. In other related embodiments of the method, communicating the at least one of (i) and (ii) occurs in response to receiving a second indicator that indicates that the user requires assistance for the duress-inducing event. In such embodiments of the method, second indicator is received by one selected from the group consisting of (i) capturing video data and determining that the video data includes a predetermined facial or body gesture of the user that defines the second indicator, (ii) capturing audio data and determining that the audio data includes a predetermined audible code provided by the user that defines the second indicator, and (iii) receiving a predetermined input to the mobile communication device that defines the second indicator.

A computer program product including a non-transitory computer-readable medium defines third embodiments of the invention. The computer-readable medium includes sets of codes for causing one or more computing processing devices to receive, at a mobile communication device, a first indicator from a user that indicates that the user is experiencing a duress-inducing event. The sets of codes additionally cause the one or more computing processor devices to, in response to receiving the first indicator, activate at least one audio or video capturing devices on the mobile communication device to initiate covert recording of at least one of audio file, video file or an audio and video file of an area surrounding the mobile communication device. Covert recording occurs absent a visual indication or an audible indication on the mobile communication device that recording is occurring.

In specific embodiments of the computer program product, the set of codes for causing the one or more computing processing devices to receive the first indicator further include one of (i) capturing video data and determining that the video data includes a predetermined facial or body gesture of the user that defines the first indicator, or (ii) capturing audio data and determining that the audio data includes a predetermined audible code provided by the user that defines the first indicator.

In other specific embodiments of the computer program product, the set of codes for causing the one or more computing processing devices to receive the first indicator further comprises receiving a predetermined input to the mobile communication device. The predetermined input includes one of (i) detecting a predetermined movement of the mobile communication device, (ii) detecting a predetermined input to a touch screen display on the mobile communication device, and (iii) capturing a facial image of the user with a rear-facing image capturing device included within the mobile communication device.

In still further specific embodiments of the computer program product, the sets of codes further include a set of codes for causing the one or more computing processing devices to communicate at least one of (i) the recorded at least one of the audio file, the video file or the audio and video file to a third-party entity responsible for analyzing the least one of the audio file, the video file or the audio and video file, and (ii) a request for physical appearance at the area of a public safety entity. In related embodiments of the computer program product, the sets of codes further include a set of codes for causing the one or more computing processing devices to analyze the video file or the audio and video file to identify predetermined objects in the video file or the audio and video file. In such embodiments of the computer program product, the set of codes for causing the one or more computing processing devices to communicate further cause the one or more computing processing devices to communicate at least one of (i) and (ii) in response to identification of one or more of the predetermined objects in the video file or the audio and video file.

Thus, according to embodiments of the invention, which will be discussed in greater detail below, the present invention provides for automatically and covertly activating audio/video mechanisms within a mobile communication device when a user is confronted with a duress-inducing event or a situation. As such, by providing for a subtle user input, such as a personal gesture, personal audible code or device input to trigger covert activation of audio/video recording mechanisms on a mobile communication device, the present invention is able to capture audio and/or video data of a duress-inducing event absent other parties to the duress-inducing event being aware that audio/video data is being captured.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
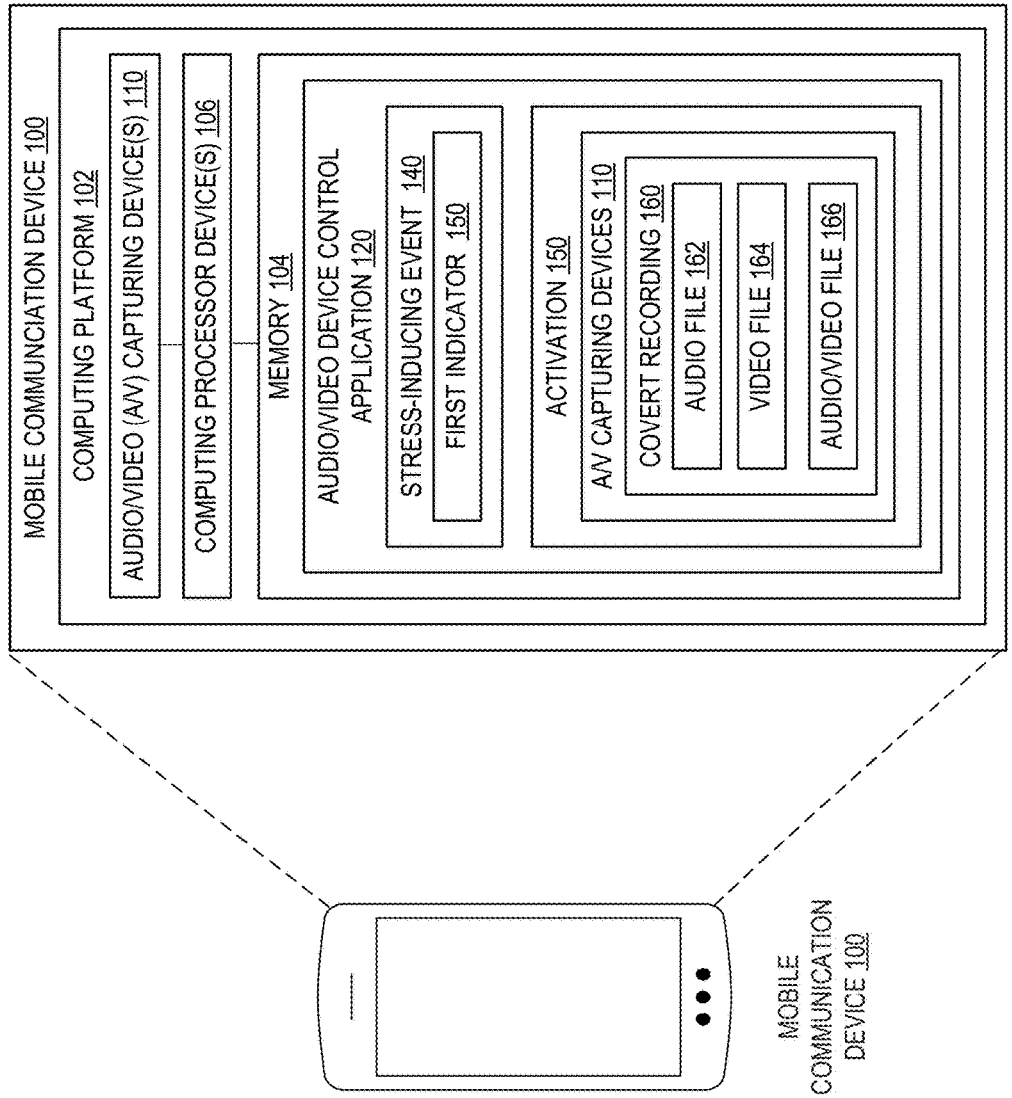
Figure 2:
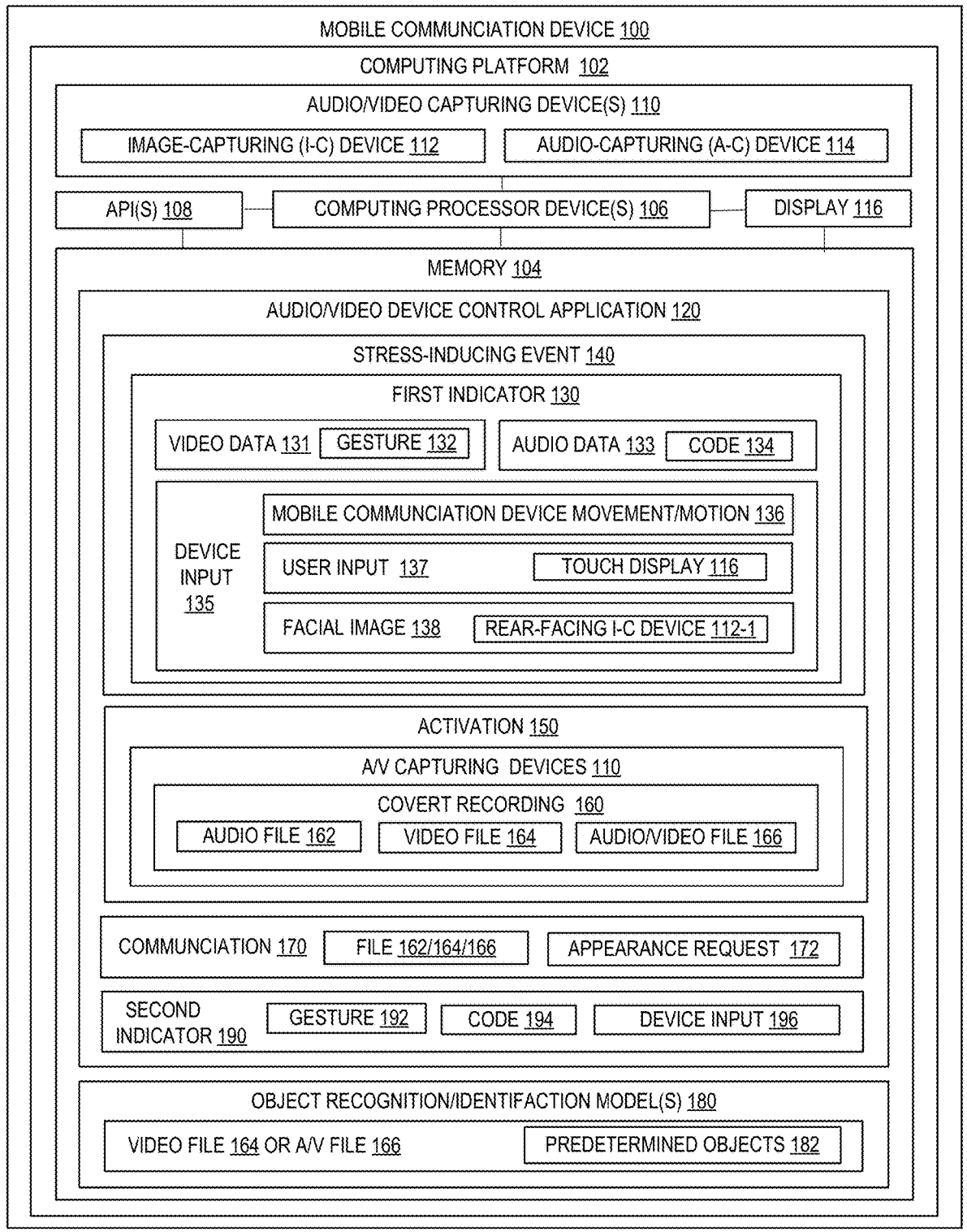
Figure 3:
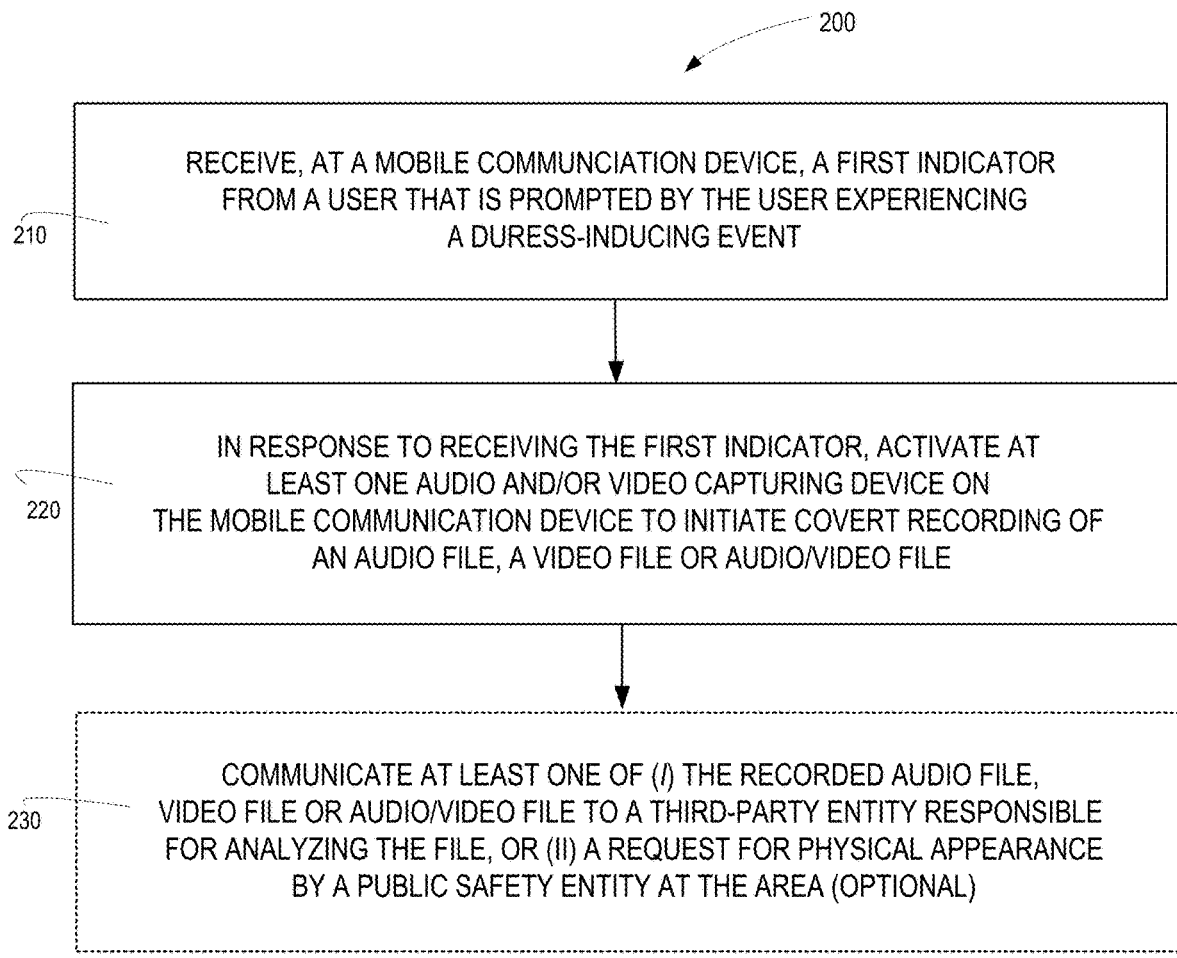

Having thus described embodiments of the disclosure in general terms, reference will now be made to the accompanying drawings, wherein:

FIG. 1 is a schematic/block diagram of a mobile communication device configured for covert recording of audio or video in response to the user experiencing a duress-inducing event, in accordance with some embodiments of the present disclosure;

FIG. 2 is a more detailed block diagram of a mobile communication device configured for covert recording of audio or video in response to the user experiencing a duress-inducing event, in accordance with some embodiments of the present disclosure; and FIG. 3 is a flow diagram of a method for covert recording of audio and/or video within a mobile communication device in response to the user experiencing a duress-inducing event, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed for automatically and covertly activating audio/video mechanisms within a mobile communication device when a user is confronted with a duress-inducing event or a situation (i.e., an event/situation in which the user may subsequently benefit from viewing or listening to a recording of the event, such as assistance in identifying parties involved in the duress-inducing event/situation).

According to embodiments of the invention, a first indicator is received at the mobile communication device that indicates that the user is experiencing a duress-inducing event. In response to receiving the first indicator, the mobile communication device is configured to activate one or more audio/video capturing devices to initiate covert recording of at least one of audio file, video file or an audio and video file. Covert recording occurs absent a visual indication or an audible indication on the mobile communication device that recording is occurring.

In specific embodiments of the invention, receiving the first indicator may include capturing image data with an image-capturing mechanism (e.g., camera or the like) of the mobile communication device and determining that the image data includes a predetermined facial or body gesture of the user. In other embodiments of the invention, receiving the first indicator may include capturing audio data with an audio-capturing mechanism (e.g., microphone or the like) of the mobile communication device and determining that the audio data includes a predetermined audio code (e.g., word, phrase, utterance or the like). In this regard, the image-capturing mechanism or audio-capturing mechanism is constantly monitoring/capturing data for the presence predetermined body/facial gesture or audible code and, upon determining the presence thereof, awakens to begin recording video and/or audio.

In still further embodiments of the invention, receiving the first indicator includes receiving a predetermined input to the mobile communication device, such as (i) detecting a predetermined movement of the mobile communication device, and (ii) detecting a predetermined input to a touch screen display on the mobile communication device, or the like.

In specific embodiments of the invention, once the audio/video file is captured it is communicated (or streamed while being captured) to a third-party entity, such as a public safety/law enforcement agency or the like, responsible for analyzing the audio/video file to determine if further actions need to be taken. In related specific embodiments of the invention, the mobile communication device is equipped with object identification model(s) that are configured to analyze the objects in the video file to determine the presence of predetermined objects (e.g., weapons or the like) as a pre-requisite for communicating the audio/video file to the third-party entity. In other specific embodiments of the invention, the first indicator itself triggers communication of a request for physical appearance of a third-party entity, such as a public safety/law enforcement agency or the like. In other related embodiments of the invention, the communication of the audio/video file to the third-party entity or the request for physical appearance of a third-party entity may be triggered by receipt of a second indicator (i.e., a second gesture, audible code or device input different than the first indicator). Thus, a first indicator prompts recording of audio/video data and a second indicator prompts either communication of the audio/video data to a third-party-entity or prompts a request for third-party entity appearance.

Thus, as described in more detail below, by providing for a subtle user input, such as a personal gesture, personal audible code or device input to trigger covert activation of audio/video recording mechanisms on a mobile communication device, the present invention is able to covertly capture audio and/or video data of a duress-inducing event without the knowledge of other duress-inducing event parties.

Turning now to the figures, FIG. 1 a schematic/block diagram is provided of a mobile communication device 100, in accordance with embodiments of the present invention. As shown in FIG. 1, the mobile communication device may be a smart telephone or any other device with computing capabilities and audio/video recording capabilities. Mobile communication device includes a computing platform 102 having a memory 104 and one or more computing processor devices 106 in communication with the memory 106. In addition, computing platform 102 includes one or more audio/video capturing devices 110, such as a camera with audio/video recording capabilities, an audio/voice recorder or the like, which are in communication with at least one of the computing device processor(s) 106.

Additionally, mobile communication 100 includes an audio/video control application 120 that is stored in the memory 104 and executable by at least one of the computing device processor(s). The audio/video control application 120 is configured to receive a first indicator 150 that is prompted by the user of the mobile communication device 100 experiencing a duress-inducing event 140. For example, the duress-inducing event 140 may be the user witnessing or being part of a wrongful/deceitful act performed by another, which may or may not be unlawful or any other event in which the user believes they are or may be threatened. As discussed in greater detail with respect to FIG. 2, in specific embodiments of the invention, first indicator 150 may comprise, but is not limited to, a user gesture, a user code, or a predetermined input to the mobile communication device 100.

In response to receiving first indicator 150, audio/video control application 120 is further configured to perform activation 150 of one or more of the audio/video capturing devices to initiate covert recording 160 of an audio file 162, a video file 164 and/or an audio/video file 166. Covert recording 160 occurs absent any visual indication or audible indication on the mobile communication device 100 that recording is occurring. In this regard, any display on the mobile communication device will not display the view of the area being recorded nor will any indication be displayed that the device is in a recording mode. Covert recording 160 is undertaken so that others participating in the duress-inducing event are unaware that audio/video recording is occurring.

Referring to FIG. 2, a block diagram is presented of mobile communication device 100, in accordance with embodiments of the present invention. In addition to providing greater details of the mobile communication device 100, FIG. 2 highlights various alternate embodiments of the invention. Mobile communication device 100 includes computing platform 102 having memory 104, which may comprise volatile and non-volatile memory, such as read-only and/or random-access memory (RAM and ROM), EPROM, EEPROM, flash cards, or any memory common to computing platforms). Moreover, memory 104 may comprise cloud storage, such as provided by a cloud storage service and/or a cloud connection service.

Further, computing platform 102 also includes at least one computing processor device 106, which may be an application-specific integrated circuit ("ASIC"), or other chipset, logic circuit, or other data processing device. Computing processor device(s) 106 may execute one or more application programming interface (APIs) 108 that interface with any resident programs, such as audio/video control application 120 or the like, stored in memory 104 of computing platform 102 and any external programs. Computing processor devices(s) 106 may include various processing subsystems (not shown in FIG. 2) embodied in hardware, firmware, software, and combinations thereof, that enable the functionality of mobile communication device 100 and the operability of mobile communication device on a distributed communication network, such as the Internet, one or more cellular networks and the like. For example, processing subsystems allow for initiating and maintaining communications and exchanging data with other networked devices. For the disclosed aspects, processing subsystems of mobile communication device 100 may include any subsystem used in conjunction with audio/video control application 120 and related tools, routines, sub-routines, algorithms, sub-algorithms, sub-modules thereof.

Additionally, as previously discussed in relation to FIG. 1, computing platform 102 includes one or more audio/video capturing devices 110, which may comprise an image-capturing device 112, such as a camera capable of recording audio/video and an audio-capturing device 114, such as an audio/voice recorder device or the like.

In specific embodiments of the invention, as discussed infra., computing platform 102 additionally includes a touch-screen display 116 configured with touch-sensitive sensors to receive user inputs.

Computing platform 102 may additionally include a communications module (not shown in FIG. 2) embodied in hardware, firmware, software, and combinations thereof, that enables electronic communications between the mobile communication device 100 and other networks and network devices. Thus, communication module may include the requisite hardware, firmware, software and/or combinations thereof for establishing and maintaining a network communication connection with one or more devices and/or networks.

Memory 104 of computing platform 102 stores audio/video control application 120 that is executable by at least one of computing processor device(s) 106. Audio/video control application 120 is configured to receive a first indicator 130 that is prompted by a user experiencing a stress-inducing event 140. In specific embodiments of the invention, first indicator 130 is received by capturing video data 131 and determining that the video data 131 includes a predetermined user gesture 132, such as facial gesture or a body gesture. In such embodiments of the invention, the image capturing device 112 is in a so-called "viewing" mode in which the image-capturing device 112 is activated (so-called "wakes-up") in response to viewing a specific predetermined image (in this instance, the predetermined gesture 132). In other specific embodiments of the invention, first indicator 130 is received by capturing audio data 133 and determining that the audio data 133 includes a predetermined audible code 134, such as a word, phrase, utterance or the like. In such embodiments of the invention, the audio capturing device 114 is in a so-called "listening" mode in which the audio-capturing device 112 is activated (so-called "wakes-up") in response to hearing specific predetermined audio (in this instance, the predetermined audible code 134). In such embodiments of the invention, the user may choose the predetermined gesture 132 or audible code 134.

In other embodiments of the invention, first indicator 130 is received by receiving a predetermined input 135 to the mobile communication device 100. In specific embodiments receiving the predetermined input 135 includes detecting a predetermined movement 136 of the mobile communication device 100, such as a predetermined movement pattern (e.g., rapid shaking of the mobile communication device) or a predetermined amount of movement as detected by one or more motion-sensing devices (not shown in FIG. 2) included within the computing platform 102 of mobile communication device 100. In other specific embodiments receiving the predetermined input 135 includes detecting a predetermined user input 137 to the touch display 116 (e.g., rapid tapping of the touch display of specified amount or a swiping motion across the touch display). In such embodiments of the invention, the user may choose the predetermined movement/motion 136 or predetermined user input 137 made to the touch display 116.

In still further embodiments of the invention, receiving the predetermined input 135 includes capturing a facial image 138 of the user with a rear-facing image-capturing device (i.e., camera) 112-1. Typical facial recognition authentication occurs using the front-facing image-capturing device (i.e., camera) of a mobile communication device, as opposed to the rear-facing image-capturing device (i.e., camera) 112-1. If the rear-facing image-capturing device (i.e., camera) 112-1 is capturing a facial image 139 of the user, it is likely that someone else other than the user is capturing the image. Moreover, the other user may be attempting to coerce the user into performing facial recognition authentication for purposes of gaining unauthorized access to the mobile communication device 100. Therefore, in such instances it may be advantageous to initiate the covert audio/video recording process, in accordance with the present invention.

As previously discussed in relation to FIG. 1, in response to receiving first indicator 150, audio/video control application 120 is further configured to perform activation 150 of one or more of the audio/video capturing devices to initiate covert recording 160 of an audio file 162, a video file 164 and/or an audio/video file 166. Covert recording 160 occurs absent any visual indication or audible indication on the mobile communication device 100 that recording is occurring. In this regard, any display on the mobile communication device will not display the view of the area being recorded nor will any indication be displayed that the device is in a recording mode.

In additional embodiments of the invention, audio/video control application 120 is further configured for communication 170 of the audio file 162, a video file 164 and/or an audio/video file 166 to a third-party entity, such as public safety/law enforcement entity or the like responsible for analyzing the audio and/video content. In specific embodiments of the invention, audio file 162, a video file 164 and/or an audio/video file 166 is streamed to the third-party entity as it is being recorded (i.e., in real-time) so that the third-party entity has immediate access to the audio and/or video content for real-time analysis. In other embodiments of the invention, the audio file 162, a video file 164 and/or an audio/video file 166 is communicated to the third-party entity in response to completion of the recording process (e.g., once the file is committed to Read-Only Memory (ROM) or the like).

In other embodiments of the invention, audio/video control application 120 is further configured for communication 170 of an appearance request 172 for a public safety entity (e.g., an emergency call requesting law enforcement presence). In specific embodiments of the invention the appearance request 172 occurs covertly without requiring the user to input any information, since the request itself will include the user's identification and location.

In other embodiments of the invention, audio/video control application 120 is configured for communication 170 of the audio file 162, a video file 164 and/or an audio/video file 166 to a third-party entity or the appearance request 172 in response to receiving second indicator 190, which may comprise a predetermined gesture 192, predetermined audible code 194 or device input 196, similar in form to but different than the predetermined gesture 132, predetermined audible code 134 or device input 135 that comprises the first indicator 130. In this regard, the user may configure a first indicator 130 for initiating the covert audio/video recording 160 process and a second indicator 190 different from the first indicator 130 for triggering either the communication of the audio file 162, a video file 164 and/or an audio/video file 166 to a third-party entity or the appearance request 172.

In still further embodiments of the invention, memory 104 stores object recognition/identification models 180 that are configured to analyze the video file 164 and/or the audio/video file 166 (or stream of video data) to determine if predetermined objects 182, such as weapons or the like are present in the video footage. In such embodiments of the invention, determination of presence of one or more of the predetermined objects 182 may trigger the audio/video control application 120 for communication 170 of the audio file 162, a video file 164 and/or an audio/video file 166 to a third-party entity or for communication 170 of the appearance request 172.

Referring to FIG. 6, a flow diagram is presented of a method 200 for covertly activating audio/video recording devices on a mobile communication device, in accordance with embodiments of the present invention. At Event 210, a first indicator is received at a mobile communication device that is prompted by a user experiencing a duress-inducing event. In specific embodiments of the method, the first indicator is received by receiving image data and detecting a predetermined user gesture, e.g., facial gesture or body gesture in the image data or by receiving audio data and detecting a predetermined audible code, e.g., word, phrase, utterance or the like in the audio data. In other specific embodiments of the method, receiving the first indicator includes receiving a predetermined input at the mobile communication device, such as a predetermined motion/movement of the mobile communication device, a predetermined input to a touch-sensitive display of the mobile communication device or any other suitable input to the mobile communication device.

In response to receiving the first indicator, at Event 220, at least one audio and/or video capturing device is activated to initiate covert recording of an audio, video and/or audio/video file. Covert recording occurs absent any audible or visual indication on the mobile communication device that recording is occurring.

In optional embodiments the method includes communicating at least one of (i) the recorded audio, video and/or audio/video file to a third-party entity responsible for analyzing the file or (ii) a request for a physical appearance by a public safety/law enforcement entity. Communicating the audio, video and/or audio/video file may include streaming the files as the video is recorded so that analysis by the third-party entity can occur in real-time. In specific embodiments of the invention, one or both of the aforementioned communications are communicated in response to receiving the first indicator or in response to receiving a subsequently received second indicator that this different than the first indicator. For example, in such embodiments of the invention, the first indicator triggers the covert recording of the audio, video and/or audio/video and the second indicator triggers communication of the recorded audio, video, and/or audio/video, and/or communication of the request for physical appearance by a public safety/law enforcement entity. In other embodiments of the method, the recorded video and/or audio/video file is analyzed by object recognition models within or accessible to the mobile communication device to determine the presence of predetermined objects within the file(s). In such embodiments of the invention, the presence of one or more predetermined object is the trigger for communicating at least one of (i) the recorded audio, video and/or audio/video file to a third-party entity responsible for analyzing the file or (ii) a request for a physical appearance by a public safety/law enforcement entity.

Thus, present embodiments of the invention, as described in detail above, provide for automatically and covertly activating audio/video mechanisms within a mobile communication device when a user is confronted with a duress-inducing event or a situation. As such, by providing for a subtle user input, such as a personal gesture, personal audible code or device input to trigger covert activation of audio/video recording mechanisms on a mobile communication device, the present invention is able to capture audio and/or video data of a duress-inducing event without the knowledge of other duress-inducing event participants.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein

What is claimed is:

1. A mobile communication device, the device comprising:
a computing platform including a memory, one or more computing processor devices in communication with the memory, and one or more audio or video capturing devices in communication with at least one of the one or more computing processor devices; and
an audio/video device control application stored in the memory, executable by at least one of the one or more computing processor devices and configured to:
receive, at a video capturing device disposed within the mobile communication device, a first indicator from a user that is prompted by the user experiencing a duress-inducing event, wherein the first indicator is a predetermined user-defined first facial and body gesture of the user identified from video data captured while the video capturing device is in a viewing mode, a user-specific audible code, and a predetermined movement pattern of the mobile communication device initiated by the user as detected by one or more motion-sensing devices associated with the mobile communication device,
in response to receiving the first indicator, move the video capturing device from the viewing mode to a recording mode to initiate covert recording of at least one of audio file, video file and an audio and video file of an area surrounding the mobile communication device, wherein covert recording occurs absent a visual indication or an audible indication on the mobile communication device that recording is occurring,
receive, at the video capturing device, a second indicator from the user, wherein the second indicator is a predetermined user-defined second facial or body gesture of the user identified from video data captured while the video capturing device is in the recording mode, wherein the predetermined second facial or body gesture is different than the first facial or body gesture, and
in response to receiving the second indicator, while covertly recording the at least one of audio file, video file and an audio and video file, stream at least one of audio data, video data or audio and video data to a predetermined third-party entity responsible for analyzing the at least one of audio data, video data and audio and video data.

2. The mobile communication device of claim 1, wherein the audio/video device control application is further configured to communicate at least one of (i) the recorded at least one of the audio file, the video file or the audio and video file to the third-party entity, and (ii) a request for physical appearance at the area of a public safety entity.

3. The mobile communication device of claim 2, further comprising one or more object identification models stored in the memory, executable by at least one of the one or more computing processors and configured to analyze the video file or the audio and video file to identify predetermined objects in the video file or the audio and video file and wherein the audio/video device control application is further configured to communicate the at least one of (i) and (ii) in response to identification of one or more of the predetermined objects in the video file or the audio and video file.

4. A computer-implemented method executed by one or more computing processor devices and comprising:
receiving, at a video capturing device disposed within the mobile communication device, a first indicator from a user that is prompted by the user experiencing a duress-inducing event, wherein the first indicator is a predetermined user-defined first facial and body gesture of the user identified from video data captured while the video capturing device is in a viewing mode, a user-specific audible code, and a predetermined movement pattern of the mobile communication device initiated by the user as detected by one or more motion-sensing devices associated with the mobile communication device;
in response to receiving the first indicator, moving the video capturing device from the viewing mode to a recording mode to initiate covert recording of at least one of audio file, video file and an audio and video file of an area surrounding the mobile communication device, wherein covert recording occurs absent a visual indication or an audible indication on the mobile communication device that recording is occurring;
receiving, at the video capturing device, a second indicator from the user, wherein the second indicator is a predetermined user-defined second facial or body gesture of the user identified from video data captured while the video capturing device is in the recording mode, wherein the predetermined second facial or body gesture is different than the first facial or body gesture; and
in response to receiving the second indicator, while covertly recording the at least one of audio file, video file and an audio and video file, streaming at least one of audio data, video data or audio and video data to a predetermined third-party entity responsible for analyzing the at least one of audio data, video data and audio and video data.

5. The computer-implemented method of claim 4, further comprising communicating at least one of (i) the recorded at least one of the audio file, the video file or the audio and video file to third-party entity, and (ii) a request for physical appearance at the area of a public safety entity.

6. The computer-implemented method of claim 5, further comprising analyzing the video file or the audio and video file to identify predetermined objects in the video file or the audio and video file and wherein communicating the at least one of (i) and (ii) occurs in response to identification of one or more of the predetermined objects in the video file or the audio and video file.

7. A computer program product comprising:
a non-transitory computer-readable medium comprising sets of codes for causing one or more computing processing devices to:
receive, at a mobile communication device, a first indicator from a user that is prompted by the user experiencing a duress-inducing event, wherein the first indicator is a predetermined user-defined first facial and body gesture of the user identified from video data captured while the video capturing device is in a viewing mode, a user-specific audible code, and a predetermined movement pattern of the mobile communication device initiated by the user as detected by one or more motion-sensing devices associated with the mobile communication device;
in response to receiving the first indicator, moving the video capturing device from the viewing mode to a recording mode to initiate covert recording of at least one of audio file, video file and an audio and video file of an area surrounding the mobile communication device, wherein covert recording occurs absent a visual indication or an audible indication on the mobile communication device that recording is occurring;

receive, at the video capturing device, a second indicator from the user, wherein the second indicator is a predetermined user-defined second facial or body gesture of the user identified from video data captured while the video capturing device is in the recording mode, wherein the predetermined second facial or body gesture is different than the first facial or body gesture; and in response to receiving the second indicator, while covertly recording the at least one of audio file, video file and an audio and video file, stream at least one of audio data, video data or audio and video data to a predetermined third-party entity responsible for analyzing the at least one of audio data, video data and audio and video data.

8. The computer program product of claim 7, wherein the sets of codes further comprise a set of codes for causing the one or more computing processing devices to communicate at least one of (i) the recorded at least one of the audio file, the video file or the audio and video file to the third-party entity, and (ii) a request for physical appearance at the area of a public safety entity.

9. The computer program product of claim 8, wherein the sets of codes further comprise a set of codes for causing the one or more computing processing devices to analyze the video file or the audio and video file to identify predetermined objects in the video file or the audio and video file and wherein the set of codes for causing the one or more computing processing devices to communicate further comprise the set of codes for causing the one or more computing processing devices to communicate at least one of (i) and (ii) in response to identification of one or more of the predetermined objects in the video file or the audio and video file.

* * * * *